Sept. 30, 1930.    R. P. LANSING    1,777,207
ENGINE STARTER
Original Filed June 28, 1926    2 Sheets-Sheet 1
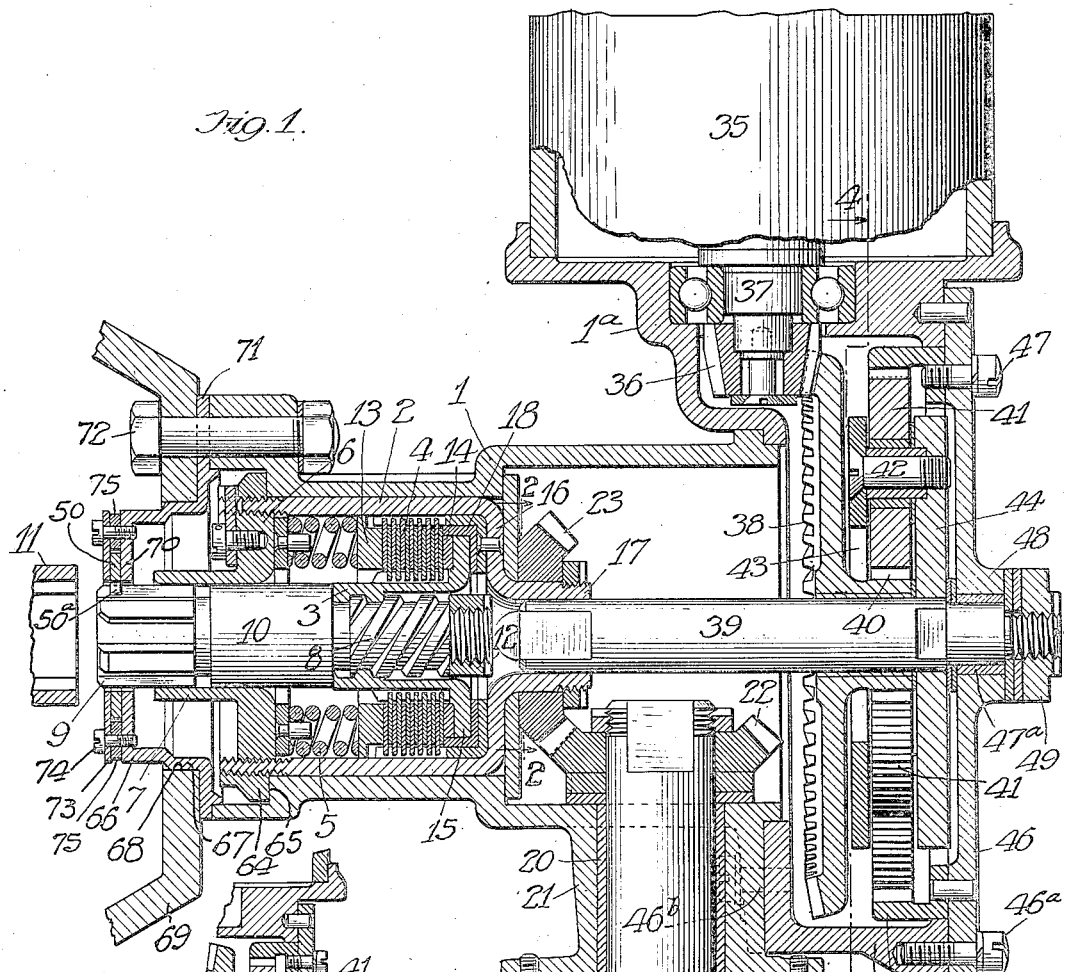
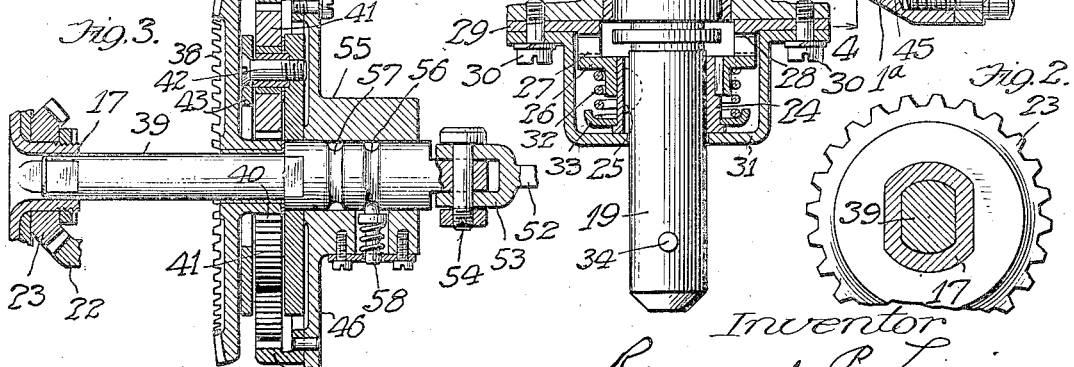
Witness
Martin H. Olsen.
Inventor
Raymond P. Lansing
By Rector, Hibben, Davis & Macauley
his Attys

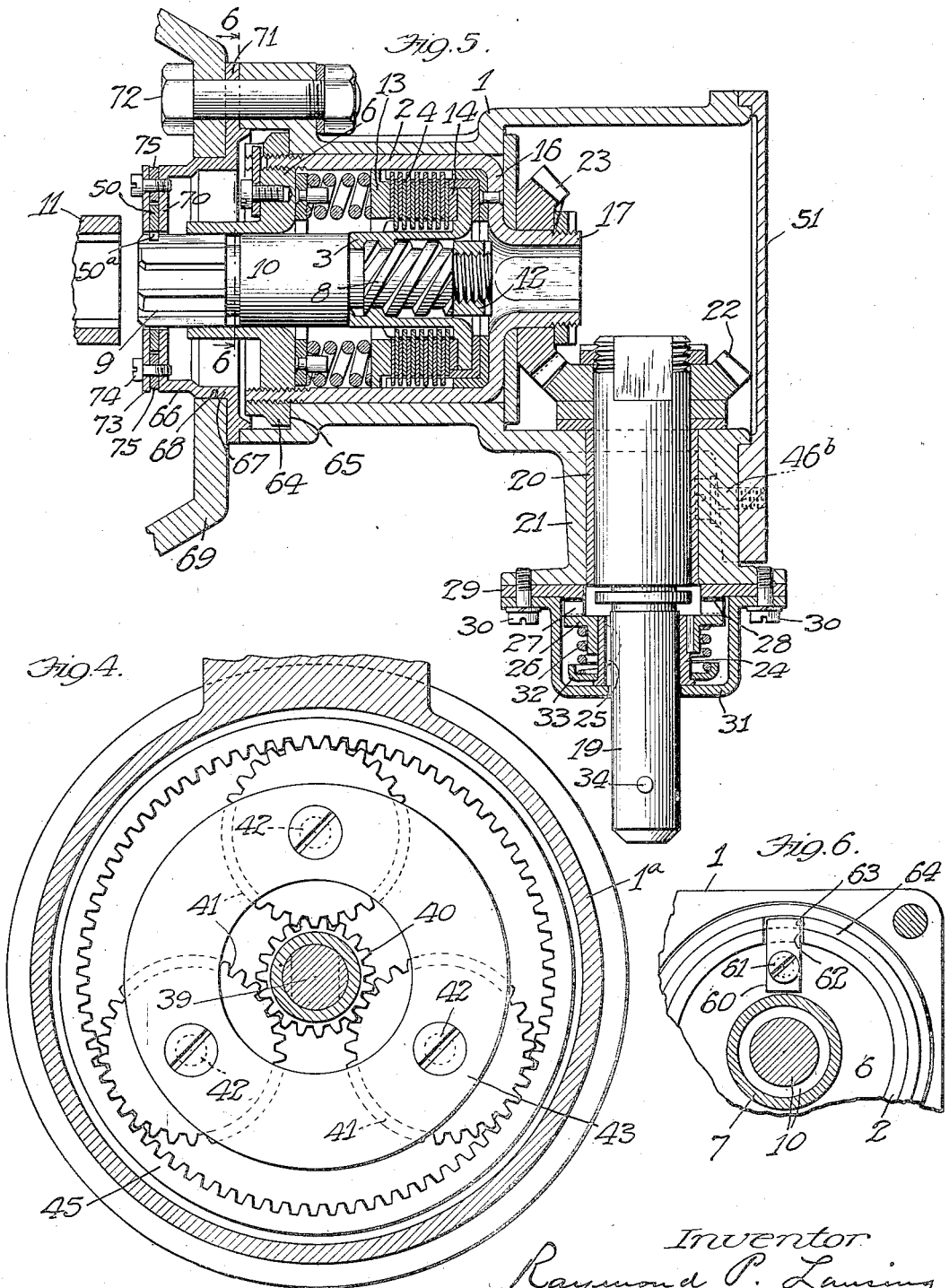

Patented Sept. 30, 1930

1,777,207

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

ENGINE STARTER

Application filed June 28, 1926, Serial No. 118,937. Renewed February 21, 1930.

My invention relates to engine starting apparatus for the starting of internal combustion engines, more particularly but not necessarily the engines of airplanes, and the object thereof is to provide a simple, efficient and reliable apparatus of this character for either power or manual operation, or both combined, the apparatus, in its preferred form, being primarily a manually operated apparatus but such that the power operating elements may be readily applied to and detachable from the apparatus. Various features of advantage and utility in the construction and operation of my apparatus will be apparent from the description hereinafter given.

In the drawings, Figure 1 is a sectional elevation of my apparatus with both the power and the manual mechanisms embodied therein; Fig. 2 a section on the line 2—2 of Fig. 1; Fig. 3 a detail section of the modified form of construction as to a part thereof; Fig. 4 a section on the line 4—4 of Fig. 1; Fig. 5 a view similar to Fig. 1 but with a power mechanism removed; and Fig. 6 a detail section on the line 6—6 of Fig. 5.

Referring to the complete apparatus as illustrated in Fig. 1, the same comprises essentially the drive or transmission proper including a driving member normally disengaged from but adapted to engage the engine member, the power mechanism such as an electric motor and including reduction gearing operatively connected therewith, and a hand cranking mechanism operatively connected with the drive or transmission.

First describing the drive or transmission as herein shown, the same is located and mounted within a main casing 1 within which rotates a barrel 2 and a nut 3 concentrically arranged therewithin and providing a considerable annular space between them, in order to receive a yielding driving connection which is here in the form of a friction clutch 4. The sets of plates of this clutch are splined respectively to the interior of the barrel and the exterior of the nut, and the proper spring pressure is provided for such friction plates by means of a series of springs 5 which are located in such annular space. The necessary spring tension is obtained by the adjustable nut 6 which is provided with a sleeve portion 7. This nut cooperates with internal screw threads in the barrel 2.

Within the nut 3 and the sleeve 7, there is mounted for longitudinal and rotary movement a shaft having towards one end screw threads 8 and at the other end a driving member 9 and an intermediate plain portion 10. The screw threads 8 are threaded to the internally threaded nut 3 and the driving member 9 as a series of splines adapted to engage corresponding splines in the end of the hollow or socketed end of the crank shaft 11 or rotatable shaft of the engine, not otherwise shown. A stop nut 12 is secured to the screw threaded end of the screw shaft to limit the left-hand movement of such shaft, Fig. 1.

According to the illustrated construction, the plates of the friction clutch 4 are held between the rings 13 and 14, the ring 14 bearing against the marginal flange 15 of the nut 3. The barrel 2 is inwardly and then outwardly flanged at its right-hand end, Fig. 1, in order to form a flange portion 16 and a central hub 17. A bushing 18 is interposed between the flange or end portion 16 of the barrel and the flange 15 of the nut.

Next describing the manual or hand cranking mechanism, the same comprises a cranking shaft 19 which has its bearing in a bushing 20 located in an opening through a boss or extension 21 of the main casing 1. The cranking shaft is provided at its inner end within the casing 1 with a bevel pinion 22 meshing with a corresponding bevel pinion 23 which is secured to the hub 17 of the barrel 2.

Means are preferably provided for locking the cranking shaft, and consequently, the driving barrel 2 against backward rotation, such as occasioned at times by back-fire of the engine. The means herein shown comprise a sleeve 24 which is keyed to the cranking shaft by the key 25 and on which is splined and thereby adapted to slide the movable member or sleeve 26 of a ratchet clutch. This sleeve has on its inner face ratchet teeth 27 adapted to cooperate with complementary teeth 28 on the outer face of a plate 29 which is clamped by the screws 30 between the end cap 31 and the end of the boss or extension 21. The movable ratchet member is normally held in engagement with the stationary member by a spring 32 interposed between such movable member and an abutment 33 at the outer end of the cap 31. This ratchet mechanism permits the cranking shaft to rotate in one direction only. This shaft is provided with the usual cranking pin 34 adapted to receive an ordinary hand crank.

Next referring to the power mechanism, the same comprises as herein shown a prime mover, such as an electric motor 35 provided with a driving pinion 36 secured to one end of its armature shaft 37. The power mechanism also includes reduction gearing, which is here of the planetary type comprising a large rotatable bevel gear 38 with which the pinion 36 meshes and which is loosely mounted upon the central or power transmitting shaft 39 of the reduction gearing. The hub of the gear 38 is formed as a pinion 40 constituting the sun gear or pinion and meshing with the three planetary pinions 41 which are mounted to revolve and to rotate on studs 42 in a frame or cage consisting of two parallel plates 43 and 44 between which said planetary pinions are adapted to rotate on said studs. These planetary pinions mesh with a large stationary gear 45 which is secured to the end plate 46 in suitable manner as by means of the screws 47. This plate 46 is secured by bolts 46ª to an intermediate casing 1ª which is itself secured to main casing 1 by screws 46ᵇ, being the same screws by which the cover plate 51 is secured in place. The casing 1ª also forms the lower end head of the electric motor. The shaft 39 is secured to the rotatable plate 44 and is adapted to be driven thereby. The extreme outer end of such shaft 39 has its bearing in a bushing 47ª in the central bearing portion 48 of the plate 46. This shaft 39 is held in proper position by means of the nut 49 screwing onto the outer end thereof.

Describing the operation of my apparatus and assuming that the hand cranking mechanism is the one employed for the cranking of the engine, an ordinary hand crank is applied to the cranking shaft 19 and the same thereby rotated with the result that the barrel 2 will be rotated through the medium of the pinions 22 and 23, hub 17, and flange 16. The torque is then transmitted through the friction clutch to the nut 3 and, because of the screw thread connection between such nut and the screw shaft and because of the fact that such screw shaft is prevented from turning by means of a friction plate 50 which engages the driving member 9, such screw shaft will be advanced longitudinally to the left, Fig. 1, and into engagement with the engine member 11. When this screw shaft reaches the limit of this longitudinal movement by reason of the contact of the stop nut 12 with the ends of the thread within the nut 3, such shaft will partake of the rotary movements of the nut and barrel, and the engine will thereupon be cranked.

When the engine starts on its own power, the screw shaft will be automatically disengaged from the engine member in the well-known manner by the screw action between it and its nut.

Now describing the operation when the electric motor is employed for cranking the engine, when such motor is energized, the pinion 36 will be rotated and likewise the shaft 39 will be rotated through the medium of the planetary gearing. The barrel 2 will thereupon be rotated with the functioning and results hereinbefore explained.

The apparatus is a convertible one and the same is a manually operated apparatus, but provision is made for the ready and convenient attachment of the power mechanism including the ready and convenient attachment of the driving mechanism thereof with such primary apparatus. To this end, the electric motor and the reduction gearing are made as a connected unit and the same is adapted to be readily and detachably fitted to the main casing 1 and its boss 21 of the apparatus. When the apparatus is merely a manually operated one, the outer end of the casing 1 is closed by a removable plate 51 which is removed when the power mechanism is applied. The shaft 39 is a part of the reduction gearing assembly and the inner end thereof is insertable in the hub 17 of the driving barrel 2 whereby the same is drivingly connected therewith by mere insertion in such hub 19.

According to the construction shown in Fig. 1, the shaft 39 and attached reduction gearing are operated whenever the cranking shaft 19 is operated, and therefore, the cranking shaft is loaded to that extent. In order to eliminate this load, I have provided the modified construction illustrated in Fig. 2 according to which the operator is enabled to withdraw the shaft 39 from the hub 17 of the driving barrel 2 whereupon such shaft and associate parts will not be rotated, but only those parts between the cranking shaft and the engine, the same constituting the drive or transmission between such cranking shaft and the engine. As shown in Fig. 3, the shaft 39 is adapted to be shifted longitudinally and to be withdrawn from the hub 17 by being pulled outwardly by the operator. In the present instance, I have shown, for this purpose, a rod 52 which extends to within a convenient reach of the operator in the cockpit of the airplane when the device is used in connection with an airplane engine and having at its inner end a yoke 53 attached by means of the pin 54 to the outer end of the shaft 39. This shaft at the point where it slides through the extended boss 55 of the cover plate 46 is provided with two circumferential grooves 56 and 57 with which cooperates a spring pressed plunger 58. These grooves determine the operative and inoperative positions respectively of the shaft 39 and serve to yieldingly hold such shaft in one of these positions or the other. When the plunger is in the groove 56 as shown in Fig. 3, the shaft 39 is in operative position because it is then in engagement with the hub 17, but when such shaft is pulled outwardly and the plunger engages the groove 57, such shaft is then in inoperative position because it has been withdrawn from its driving engagement with the hub 17, which thereby disables the gearing and power means.

In order to hold the nut 6 in proper adjusted position, suitable means are employed such as that shown in detail in Fig. 6, the same comprising a flat plate 60 which is removably secured to the nut by the screw 61 and seats in a groove 62 in the end of the barrel 2 and in a groove 63 in the fastening nut 64. This latter nut screws onto the exterior of the barrel and by bearing against the shoulder 65 in the interior of the main casing 1 holds the barrel in proper operative relation therein. This plate 60 locks together all three members 6, 2 and 64 and thereby maintains the predetermined adjustment or setting of the nut 6.

As herein shown the friction plate 50 and its associated parts are made as an assembly for the purpose described and for the additional purpose of an engine pilot particularly one of small diameter. This friction plate assembly comprises a casing 66 of two different diameters of which the larger one 67 is used as the pilot diameter to fit the opening 68 of the engine casing which is here the crankcase 69. The casing 66 has an outer end flange 70 which is inwardly directed and provided with a central opening through which the driving member 9 travels. This casing also has an inner end flange 71 which is outwardly directed and clamped between the end of the main casing 1 and the crankcase 69 by suitable bolts, one of which 72 is shown in the drawings.

The friction plate 50 which is the form of a ring with projections 50ª into the splines of the driving member 9 is frictionally clamped between the flange 70 and the ring 73 by means of the screws 74 which are provided between such flange and ring with slightly dished spacing washers 75.

By the use of my construction as described, I am enabled to use a comparatively small diameter of engine casing opening without decreasing in proportion the dimensions of the drive or transmission, particularly of the clutch assembly.

I claim:

1. An engine starter including as one assembly a complete operative drive including a driving member adapted to engage and crank a member of the engine to be started, and manually operated means for such drive, and as a second assembly, a prime mover and reduction gearing, which second assembly is adapted and arranged to be bodily-detachably secured to and detachably drivingly connected with the first assembly whereby the first assembly may be operated independently of the second assembly.

2. An engine starter including a rotatable longitudinally movable shaft having a driving member adapted to engage and drive a member of the engine to be started, a rotatable member operatively connected with the driving member, power mechanism and manual mechanism at the same end of said rotatable member, and separate means of attachment for said two mechanisms to said end of the rotatable member.

3. An engine starter including a rotatable longitudinally movable shaft having a driving member adapted to engage and drive a member of the engine to be started, a rotatable member operatively connected with the driving member, power mechanism and manual mechanism, said rotatable member having a hub, to whose exterior the manual means is drivingly attached and to whose interior the power means is drivingly attached.

4. An engine starter including a rotatable longitudinally movable shaft having a driving member adapted to engage and drive a member of the engine to be started, a rotatable member operatively connected with the driving member, power mechanism and manual mechanism, said rotatable member having a hub, and a pinion secured thereto and operatively connected with the manual means, the interior of the hub being adapted to be drivingly connected with the power means.

5. An engine starter including a rotatable longitudinally movable shaft having a driving member adapted to engage and drive a member of the engine to be started, a rotatable member operatively connected with the driving member, power mechanism and manual mechanism, said rotatable member having a hub provided with a central bore, the manual means being operatively connected with said hub, and said power means including reduction gearing and a central shaft adapted to be received by such bore and to be thereby operatively connected with said hub.

6. An engine starter including a rotatable longitudinally movable shaft having a driving member adapted to engage and drive a member of the engine to be started, a rotatable member operatively connected with the drive member, power mechanism and manual mechanism, said rotatable member having a hub provided with a central bore, the manual means including a cranking shaft and gearing between it and such hub, and the power means including reduction gearing and a central shaft adapted to be received by such bore and to be thereby operatively connected therewith.

7. An engine starter including a rotatable longitudinally movable shaft having a driving member adapted to engage and drive a member of the engine to be started, a rotatable member operatively connected with the driving member, power mechanism and manual mechanism, and a main casing for said members and the manual means, the latter being mounted therein, said rotatable member having a hub provided with a central bore, transmission mechanism including reduction gearing and a shaft adapted to be operatively connected with said hub, a second casing detachably connected with said main casing and enclosing the transmission mechanism.

8. An engine starter including as one assembly a drive including a driving member adapted to engage and crank a member of the engine to be started, and manually operated means for such drive, and as a second assembly bodily detachable from the first a prime mover and reduction gearing, said second assembly including means whereby the same may be operatively disconnected from the drive at the will of the operator.

9. An engine starter including a drive including a driving member adapted to engage and crank a member of the engine to be started, and axially-fixed manually operated means for such drive, a prime mover, and transmission mechanism which is located between the prime mover and the drive and which includes means whereby such transmission may be operatively disconnected from the drive at the will of the operator.

10. An engine starter including a drive including a driving member adapted to engage and crank a member of the engine to be started, and axially-fixed manually operated means for such drive, a prime mover, the manually operated means and the prime mover being independently connected with the drive, and manually-shiftable means for disconnecting the prime mover from the drive at the will of the operator.

11. An engine starter including a drive including a driving member adapted to engage and crank a member of the engine to be started, automatic means for advancing said member when the drive is operated and manually operated means for such drive, a prime mover, a transmission between the prime mover and the drive comprising reduction gearing and a shaft between such gearing and the drive, said shaft being disconnectable from the drive at the will of the operator.

12. An engine starter including a drive including a driving member adapted to engage and crank a member of the engine to be started, and axially-fixed manually operated means for such drive, a prime mover, a transmission between the prime mover and the drive comprising reduction gearing and a shaft between such gearing and the drive, said shaft being mounted for longitudinal movement to disengage it from the drive at the will of the operator, and manual means for longitudinally shifting said shaft.

13. An engine starter including a drive including a driving member adapted to engage and crank a member of the engine to be started, and axially-fixed manually operated means for such drive, a prime mover, a transmission between the prime mover and the drive comprising reduction gearing and a shaft between such gearing and the drive, said shaft being mounted for longitudinal movement to disengage it from the drive at the will of the operator, manual means for longitudinally shifting said shaft and means for yieldingly holding the shaft in its operative or inoperative positions respectively.

14. An engine starter including a drive including a driving member adapted to engage and crank a member of the engine to be started, and axially-fixed manually operated means for such drive, a prime mover, a transmission between the prime mover and the drive comprising reduction gearing and a shaft between such gearing and the drive, said shaft being mounted for longitudinal movement to disengage it from the drive at the will of the operator, manual means for longitudinally shifting said shaft and means for yieldingly holding the shaft in its operative or inoperative positions respectively, said means comprising a spring pressed plunger, said shaft having two spaced circumferential grooves with which such plunger cooperates.

15. An engine starter including a drive including a driving member adapted to engage and crank a member of the engine to be started, and manually operated means for such drive, said drive including also a driven hub operatively connected with said driving member and with said manually operated means, a prime mover, and transmission mechanism between such prime mover and said hub, and means whereby such transmission may be disabled at the will of the operator.

16. An engine starter including a drive including a driving member adapted to engage and crank a member of the engine to be started, and manually operated means for such drive, said drive including also a driven hub operatively connected with said driving member and with said manually operated means, a prime mover, and transmission mechanism between such prime mover and said hub, and including a shaft normally in engagement with such hub but slidable longitudinally to disconnect it from such hub.

17. An engine starter including a rotatable longitudinally movable shaft having a driving member adapted to engage and drive a member of the engine to be started, a rotatable member operatively connected with the drive member, power mechanism and manual mechanism, said rotatable member having a hub provided with a central bore, the manual means including a cranking shaft and gearing between it and such hub, and the power means including reduction gearing and a central shaft adapted to be received by such bore and to be thereby operatively connected therewith, said central shaft being longitudinally shiftable to disengage it from said hub without disturbing the gearing.

18. An engine starter including a rotatable longitudinally movable shaft having a driving member adapted to engage and drive a member of the engine to be started, a rotatable member operatively connected with the driving member, power mechanism and manual mechanism, and a main casing for said members and the manual means, the latter being mounted therein, said rotatable member having a hub provided with a central bore, transmission mechanism including reduction gearing and a shaft adapted to be operatively connected with said hub, a second casing detachably connected with said main casing and enclosing the transmission mechanism, and a cover plate for such second casing and to which said transmission is attached.

19. An engine starter including a rotatable longitudinally movable shaft having a driving member adapted to engage and drive a member of the engine to be started, a rotatable member operatively connected with the driving member, power mechanism and manual mechanism, and a main casing for said members and the manual means, the latter being mounted therein, said rotatable member having a hub provided with a central bore, transmission mechanism including reduction gearing and a shaft adapted to be operatively connected with said hub, a second casing detachably connected with said main casing and enclosing the transmission mechanism, and a cover plate for such second casing, such plate having an extended boss provided with a bore in which such shaft is arranged to slide to disconnect it from said hub.

20. An engine starter including a rotatable longitudinally movable shaft having a driving member adapted to engage and drive a member of the engine to be started, a rotatable member operatively connected with the driving member, power mechanism and manual mechanism, and a main casing for said members and the manual means, the latter being mounted therein, said rotatable member having a hub provided with a central bore, transmission mechanism including reduction gearing and a shaft adapted to be operatively connected with said hub, a second casing detachably connected with said main casing and enclosing the transmission mechanism, and a cover plate for such second casing, such plate having an extended boss provided with a bore in which such shaft is arranged to slide to disconnect it from said hub, said shaft having two spaced circumferential grooves, and a spring pressed plunger mounted in said boss and cooperating with said grooves.

21. An engine starter including a drive having a driving member shiftable to engage and rotatable to crank a member of an engine to be started, a rotatable member concentric of and drivingly associated with said driving member, axially-fixed manually-operable means operatively associated with said rotatable member, power means and reduction gearing therefor, and manually-shiftable means independent of the aforesaid manual means for connecting or disconnecting said reduction gearing and said rotatable member at the will of the operator.

22. An engine starter including a drive having a driving member shiftable longitudinally to engage and rotatable to crank a member of an engine to be started, a rotatable member concentric of and drivingly associated with said driving member, axially-fixed, manually-operable means drivingly geared to said rotatable member, power means and reduction gearing therefor, said reduction gearing including planetary gearing coaxial with and in rear of said driving member, and a manually-shiftable member coaxial with said planetary gearing for connecting or disconnecting said reduction gearing and said rotatable member.

23. An engine starter including as one assembly a complete operative drive including a driving member adapted to engage and crank a member of the engine to be started, a rotatable member drivingly connected with said driving member, and manually-operated cranking means in constant operative association with said rotatable member, and as a second assembly a prime mover, reduction gearing operatively associated with said prime mover, and manually shiftable means for connecting or disconnecting said reduction gearing and said rotatable member, said second assembly being adapted and arranged to be bodily detachably secured to said first assembly.

In testimony whereof, I have subscribed my name.

RAYMOND P. LANSING.